United States Patent

Parsons

[19]

[11] Patent Number: 4,665,769

[45] Date of Patent: May 19, 1987

[54] DIFFERENTIAL DRIVE

[76] Inventor: Frederick L. Parsons, Box 71, Pearce, Ariz. 85625

[21] Appl. No.: 786,338

[22] Filed: Oct. 10, 1985

[51] Int. Cl.[4] .............................................. F16H 1/42
[52] U.S. Cl. ..................... 74/714; 74/710.5
[58] Field of Search .............. 74/714, 710, 711, 710.5

[56] References Cited

U.S. PATENT DOCUMENTS

| | | | |
|---|---|---|---|
| 1,317,281 | 9/1919 | Evans | 74/714 |
| 1,405,986 | 2/1922 | Elbertz | 74/714 |
| 1,483,606 | 2/1924 | Krohn | 74/714 |
| 1,499,467 | 7/1924 | Mead | 74/711 |
| 1,638,980 | 8/1927 | Cadman | 74/711 |
| 1,716,073 | 6/1929 | McFarlane | 74/710 |
| 1,730,183 | 10/1929 | Wildhaber | 74/714 |
| 2,322,394 | 6/1943 | Sharpe | 74/714 X |
| 2,974,740 | 3/1961 | Ware et al. | 74/714 X |
| 3,198,035 | 8/1965 | Mueller | 74/650 |
| 3,494,226 | 2/1970 | Biddle | 74/711 |
| 3,738,192 | 6/1973 | Belansky | 74/711 |
| 3,768,336 | 10/1973 | Wharton | 74/714 |

OTHER PUBLICATIONS

Gleason's Impossible Differential Popular Science, Feb. 1984, pp. 58–61.

Primary Examiner—Leslie Braun
Assistant Examiner—Joseph M. Rolnicki
Attorney, Agent, or Firm—Brumbaugh, Graves, Donohue & Raymond

[57] ABSTRACT

A differential system for transmitting power to a split pair of wheel axles utilizes a coupled pair of special planetary gear sets to proportion torque when the wheels negotiate a turn or lose traction. The gear ratio of each set is such that when the driving torque is in the speed increase mode of the gears, the two lock and rotate in the same direction but when the torque is on the sun gear caused by feedback due to negotiating a turn, the sun gear nutates within the ring gear to adjust for speed differentials. The sun gear of each set drives an eccentric cam on its associated wheel axle and is adapted to drive the ring gear of the opposite set by the provision of torque-transmission coupling therebetween.

4 Claims, 3 Drawing Figures

DIFFERENTIAL DRIVE

BACKGROUND OF THE INVENTION

1. Field of the Invention

The present invention relates to differential gear drives for motor vehicles and, more particularly, to an improved differential which employs eccentrically arranged planetary gear pairs for transmitting power from the differential housing to the wheel axles.

2. The Prior Art

Prior art differential gear drives have generally been of three basic types: the standard bevel gear differential, the so-called limited-slip differential, and the lock-up differential.

In the standard differential, engine torque is delivered equally to both wheels so long as the vehicle moves in a straight line and both wheels have traction. Upon cornering or loss of traction to one wheel, however, the differential tends to deliver power to the wheel of least rolling resistance. While permitting the wheels to corner, this characteristic of the standard differential renders it incapable of distinguishing between loss of traction on a slippery surface or because of turning. Hence the standard differential has serious traction disadvantages.

Limited-slip differentials overcome the problems of the standard differential to a certain extent. In a typical construction, a clutch located between the differential housing and the side gears engages to limit movement between the housing and the side gears, thereby forcing both axles to rotate with the housing. This results in the transfer of torque to the stationary or slower spinning wheel. Although representing an improvement over the standard differential, by virtue of the transfer of torque to the wheel with the greater traction, the limited slip differential is not fully satisfactory. For instance, this type differential is susceptible to high wear and noise, increased fuel consumption, increased tire wear, unpredictable lock-up and the like. In addition, limited-slip differentials are limited to a maximum torque bias of two-and-one half to one.

The third basic differential type, the lock-up type, locks up both wheels simultaneously in response to wheel slip. This differential, however, loses traction in turns, where the outer wheel must disengage to travel around the turn. While affording a higher torque bias, e.g. ten to one, than the limited-slip differential, the lock-up differential is subject to unpredictable lock-up and is not considered suitable for general highway use.

More recent efforts to overcome the foregoing drawbacks of the basic differential types have included the Gleason Torsen differential, as described in the February 1984 edition of Popular Science. This differential appears to overcome certain of the disadvantages of earlier differentials, but relies on a relatively complex and costly gearworm wheel design to transfer torque between wheels.

Accordingly, a continuing need exists, and has long existed, for a differential that will solve the problems encountered in differential gear design and yet do so in a simple and inexpensive manner.

SUMMARY OF THE INVENTION

These and other requirements are met, in accordance with the present invention, by a novel differential system employing a pair of planetary gear sets of atypical configuration. In each of these planetary gear sets, an internal or ring gear surrounds a meshing eccentric sun gear that is assembled in a carrier in such a fashion that the drive is essentially irreversible, or non-reciprocal, so that when the driving torque is on the sun gear, it can only nutate, being confined by a plurality of pins in the carrier located in appropriately sized openings in the sun gear. The inner surface of the sun gear is rotatively connected to an eccentric cam mounted on one of the axles of the split pair wheel axles. The size of the openings in the sun gear is such as to provide the same eccentric offset as that of the eccentric cam. In this design, one revolution of the eccentric cam would cause the sun gear to nutate within its carrier one turn. In such a system for example, if the ring gear were chosen to have eighty teeth and the eccentric sun gear seventy-eight teeth, one revolution of the eccentric cam would displace the ring gear by only two teeth representing a gear ratio of forty to one. Such a high gear ratio makes the drive substantially irreversible, or non-reciprocal, and when the ring gear is kept from rotating, any rotation of the eccentric cam will cause the eccentric sun gear to nutate, causing its associated carrier to rotate in the direction opposite that of the axle-mounted eccentric cam. When the carrier is kept from rotating, any rotation of the eccentric cam will cause the eccentric sun gear to nutate, thus causing the ring gear to rotate in the same direction as the axle-mounted eccentric cam.

On the other hand, when the driving torque is applied to the ring gear, the sun gear and the eccentric cam will lock up and rotate as a single unit.

A feature of the invention is the rotative coupling of the ring gear of one such planetary set with the carrier of another such planetary set and the ring gear of the latter with the carrier of the former.

In my novel differential system, the ring gear of a first planetary gear set of the kind described is driven by the engine drive shaft, typically by way of the differential gear case, the inner surface of the sun gear being rotatively coupled to an eccentric cam on one of the wheel axles. The sun gear of this first set is further coupled through an intermediate carrier member to the ring gear of a second similar gear set. The inner surface of the sun gear of the second set is rotatively coupled to an eccentric cam on the other of the wheel axles of the split axle pair. The sun gear of this second set is coupled via an intermediate carrier member and the differential case to the ring gear of the first set. The interconnections between the sun gear of one set and the ring gear of the other set are via a plurality of studs or pins which are received in corresponding apertures in the annullus of each sun gear and serve as the intermediate carrier.

In this system, when the driving torque is in the speed increase mode and on the ring gear, the latter locks with the sun gear, causing it, its cam and the sun gear all to rotate as a single unit. Alternatively, when the driving torque is in the opposite direction, i.e. from the eccentric cam, the mechanical advantage causes the sun gear to nutate with the ring gear, while rotating in a direction opposite to that of the cam. This property of the planetary set is used to advantage when one wheel needs to rotate faster than the other, as the outside wheel does in a turn. In this instance, the extra rotational rate of the axle associated with the outside wheel by virtue of the action of the intermediate carrier coupling described above is translated into a corresponding decrease in the rotational rate of the axle associated with the inside wheel.

In this system, not only is there automatic adjustment of the relative rotational rates of the axles when a turn is negotiated, but each axle has its own separate gear set to eliminate the problem that arises with prior differentials when one wheel slips. These advantages are achieved without the use of bevel gears as in the standard bevel-gear differential.

BRIEF DESCRIPTION OF THE DRAWINGS

The invention will be better understood from the following description of an illustrative embodiment taken in conjunction with the accompanying drawings, in which.

DETAILED DESCRIPTION

Figure 1:
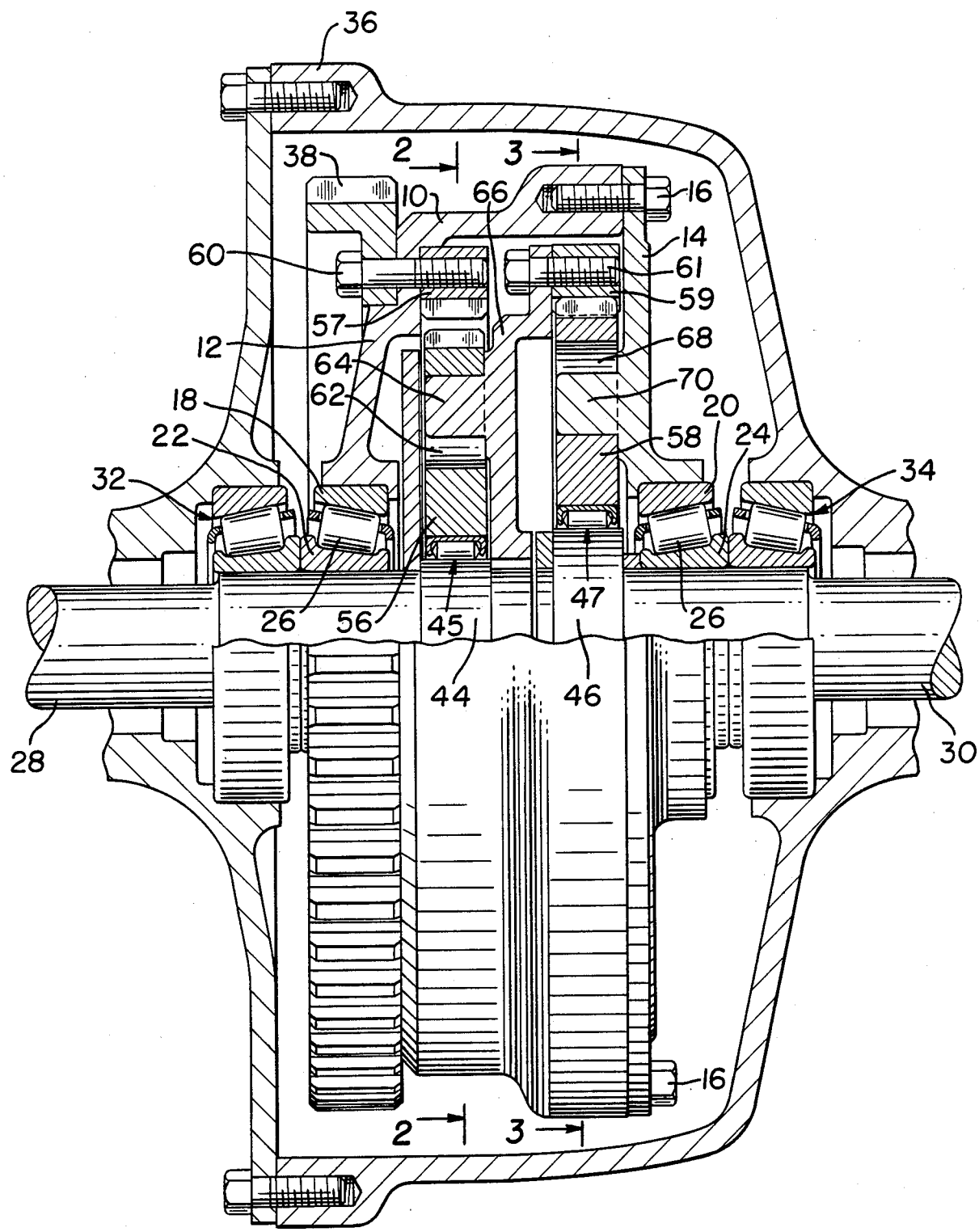
FIG. 1 is a partial sectional view taken along the plane of the wheel axles of one embodiment of a differential gear drive constructed in accordance with the invention.

In the illustrated embodiment, as seen in FIG. 1, the differential is shown as including a circular gear case 10 having an integral end plate 12 and a removable cover plate 14; the cover plate being secured to the case 10 by circumferentially-spaced bolts 16 or other conventional means. The plates 12 and 14 each carry a bearing race 18 and 20, respectively, at the radially inner edge thereof, which cooperate with respective bearing races 22 and 24 and intermediate roller bearings 26 to rotatably support the case 10 on the inner ends of the opposed split-pair wheel axles 28 and 30. The axles 28 and 30, in turn, are rotatably supported by roller-bearing assemblies 32 and 34 within the stationary differential housing 36 which is partially open (not shown).

The gear case 10 is recessed or otherwise shaped to receive the master ring gear 38 which engages in conventional fashion the pinion gear (not shown) at the end of the engine drive shaft, by way of an opening in the differential housing 36.

Figure 2:
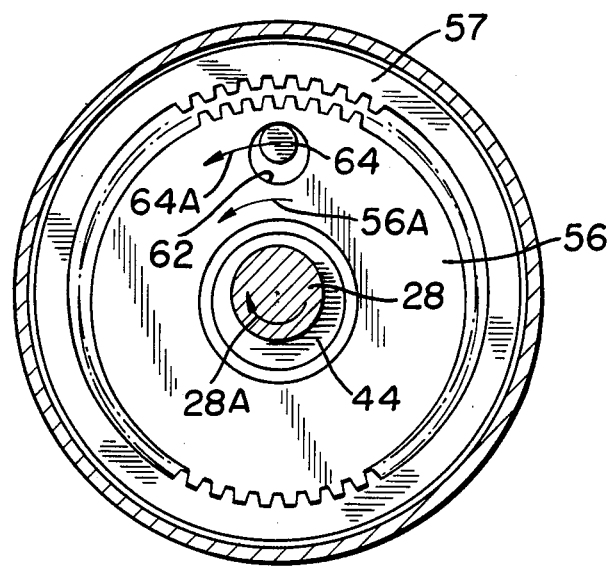
FIG. 2 is a simplified sectional view of the embodiment of FIG. 1, taken along the line 2—2 and looking in the direction of the arrows.
Figure 3:
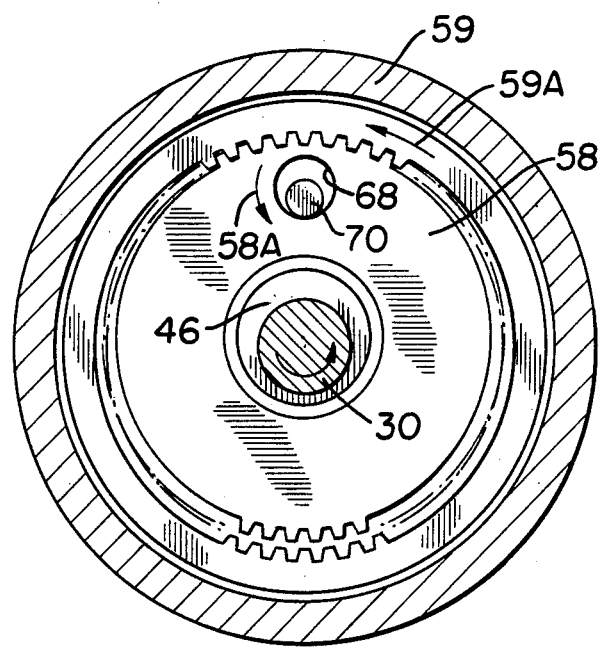
FIG. 3 is a simplified sectional view of the embodiment of FIG. 1, taken along the line 3—3 and looking in the direction of the arrows.

As seen more clearly in FIGS. 2 and 3, associated with the axles 28 and 30 are the eccentric cams 44 and 46, respectively. As shown for illustration purposes, the cam 44 on axle 28 has its center below the center of the axle 28 while the cam 46 on axle 30 has its center above the center of axle 30.

Coupled to the cam 44, by way of the needle bearings 45 (see FIG. 1) is the sun gear 56 and its associated ring gear 57. Coupled to the cam 46 by way of needle bearings 47 (see FIG. 1) is the sun gear 58 and its associated ring gear 59. For clarity, FIGS. 2 and 3 have been simplified by not showing the needle bearings. Each sun gear is free to rotate eccentrically with its eccentric cam while maintaining engagement continuously with its surrounding ring gear. To this end, each sun gear has teeth continuously around its exterior circumferential edge and each ring gear has a greater number of matching teeth continuously around its circumferential interior edge, although in FIGS. 2 and 3 for further simplification not all of the teeth have been shown. The ring gears 57 and 59 are concentric with the respective axles 28 and 30. The ring gear 57 is integrally coupled to the gear case 10 by way of circumferentially-spaced bolts 60 and rotates with it, while the ring gear 59 is free to rotate independently of the gear case.

The sun gear 56 is provided with a plurality, advantageously at least six, essentially circular openings 62 around its circumference, although only one opening has been shown in FIG. 2, for purposes of simplification. Within each opening extends a pin or stud 64 which is integral with a carrier member 66 which is rigidly coupled to the ring gear 59 by way of circumferentially-spaced bolts 61. Rotation of the sun gear 56 forces the pin 64, carrier member 66 and gear 59 to rotate with it. The openings 62 are sized relative to the pin 64 to provide for eccentric movement of the sun gear 56 relative to the carrier member 66, which is concentric to the axles 28 and 30.

The sun gear 58 is similarly provided with a number, again advantageously at least six, of like-sized openings 68 circumferentially-disposed, also only one of which is shown in FIG. 3. Within each opening extends a pin or stud 70, which extends from the end plate 16 of the gear case 10. Assuming that the vehicle is turning so as to rotate the wheel axle 28 faster than axle 30, which will be treated as extra clockwise rotation (as viewed in FIG. 2), the added rotation creates a torque which is directed from the wheel axle 28 to its eccentric cam 44 and then to the sun gear 56 of the gear pair 56, 57. In this direction, as previously discussed, the torque has a very high mechanical advantage and can readily overcome the locking forces on the sun/ring gear combination 56, 57, thereby causing the gear 57 to unlock and to rotate in a fashion to compensate for the slight speed difference. In particular, the extra clockwise rotation of the axle 28 causes the associated eccentric cam 44 to similarly rotate clockwise (in the direction of the arrow 28A in FIG. 2). The clockwise rotation of cam 44 causes its sun gear 56 to rotate eccentrically, i.e., "nutate" as it engages the ring gear 57, which is tied to the gear case and so is "stationary" with respect to the change. Accordingly, the sun gear 56 rotates "counterclockwise" with respect to the steady state, as depicted by the arrow 56A in FIG. 2. The "counterclockwise" rotation of sun gear 56 forces the pins 64 which are bounded by the holes 62 in the sun gear 56 to rotate "counterclockwise", indicated by the arrow 64A. As the pins 64 are integral with the carrier member 66, which in turn is coupled to the ring gear 59 of the planetary set associated with wheel axle 30, the ring gear 59 is forced to rotate "counterclockwise" with respect to the steady state, as shown in FIG. 2. As depicted in FIG. 3, the "counterclockwise" rotation of gear 59 (arrow 59A) causes its associated sun gear 58 to nutate while rotating in the same "counterclockwise" direction, (arrow 58A) thereby causing the eccentric cam 46 and wheel axle 30 to rotate in "counterclockwise" direction, i.e., slower. Therefore, as axle 28 rotates faster than the gear case 10, the other axle 30 rotates slower by a corresponding amount. Conversely a similar analysis would show that if axle 28 rotates slower than the gear case, axle 30 rotates faster.

When the wheels are moving straight, the engine drive shaft drives the gear case 10 which drives the ring gear 57, its sun gear 56 and the associated cam 48 on axle 28 as a unit, and the sun gear 56 similarly drives the studs 64, the coupling member and the ring gear 59. The latter in turn drives its sun gear 58 and the associated cam 46 on axle 30 as a unit. Accordingly, both axles are rotated at the same rate determined by the rotation rate of the engine drive shaft. If either wheel slips, this little affects the drive on the other because of its separate locked up drive system.

It should be understood that the specific embodiment described is merely illustrative of the invention and that various modifications will be evident to a worker in the art without departing from the spirit and scope of the invention. For example, in particular instances, one may choose not to drive the ring gear of the first pair by way of a rotatable gear case. Additionally, techniques can be derived for coupling the sun gear of one pair with a internal gear of the other pair other than by the use of a stud which is driven by the sun gear, such as a known Scotch yoke.

I claim:

1. A differential for driving a split pair of wheel axles comprising:
   first and second planetary gear sets, each set comprising a sun gear and a surrounding ring gear, each sun gear having a first number of teeth continuously around its external circumferential edge, and each ring gear having a greater second number of matching teeth continuously around its inner circumferential edge, each sun gear including a plurality of openings spaced around its circumference;
   first and second eccentric cams, each coupled to a respective one of the pair of wheel axles and rotatively coupled to a respective one of the sun gears, each sun gear being free to rotate eccentrically with its eccentric cam while maintaining continuous engagement with its surrounding ring gear;
   first and second carrier means coupled to the ring gear of the first and second gear sets, respectively, each including a plurality of studs, each of the plurality of studs of the first carrier means fitting loosely extending into a respective opening of the sun gear of the second set for confining its lateral movement and for eccentric rotational coupling thereto, each of the plurality of studs of the second carrier fitting loosely into a respective opening of the sun gear of the first set for confining its lateral movement and for eccentric rotational coupling thereto, such that one revolution of an eccentric cam causes its coupled sun gear to nutate one turn whereby the sun gear is displaced only by the difference in the number of teeth between the ring gear and the sun gear, the characteristic gear ratio of such displacement being high enough that when the driving torque is from the ring gear, the ring gear locks with the sun gear, causing the sun gear, the coupled cam and the ring gear to rotate as a single unit and when the driving torque is from the eccentric cam, the sun gear nutates within the ring gear causing its coupled carrier to rotate, relative to a steady state, in a direction opposite that of the eccentric cam, and
   means for coupling the ring gear of the first set to an engine drive shaft for rotation therewith.

2. A differential in accordance with claim 1 in which the ring gear of the first set is integrally coupled to a gear case while the ring gear of the second set is free to rotate independently of the gear case.

3. A differential in accordance with claim 1 in which the openings in each of the sun gears are sized relative to the studs in the openings to provide for the eccentric movement of each sun gear relative to the carrier means which are concentric with the wheel axles.

4. A differential according to claim 1 in which there are at least six studs on each carrier means.

* * * * *